(12) United States Patent
Hagino et al.

(10) Patent No.: US 11,149,838 B2
(45) Date of Patent: Oct. 19, 2021

(54) LUBRICATING DEVICE FOR COMPONENTS WITHIN CASING STRUCTURE OF VEHICULAR POWER TRANSMITTING SYSTEM

(71) Applicant: Toyota Jidosha Kabushiki Kaisha, Toyota (JP)

(72) Inventors: Yoshiteru Hagino, Nisshin (JP); Yuki Katayama, Toyota (JP); Kazuaki Kamiya, Toki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 406 days.

(21) Appl. No.: 16/222,174

(22) Filed: Dec. 17, 2018

(65) Prior Publication Data

US 2019/0186621 A1 Jun. 20, 2019

(30) Foreign Application Priority Data

Dec. 20, 2017 (JP) .............................. JP2017-244536

(51) Int. Cl.
*F16H 57/04* (2010.01)
*F01M 9/06* (2006.01)
(Continued)

(52) U.S. Cl.
CPC ........... *F16H 57/0423* (2013.01); *F01M 9/06* (2013.01); *F16H 57/02* (2013.01); *F16H 57/045* (2013.01);
(Continued)

(58) Field of Classification Search
CPC .... F16H 57/02; F16H 57/037; F16H 57/0409; F16H 57/042; F16H 57/0423;
(Continued)

(56) References Cited

U.S. PATENT DOCUMENTS 1,220,810 A * 3/1917 Alquist ............... F16H 57/0447
184/6.12
1,554,081 A * 9/1925 Garrett ................ F16H 57/0456
184/6.12
(Continued)

FOREIGN PATENT DOCUMENTS

EP 2 674 643 A1 12/2013
EP 2 700 849 A1 2/2014
(Continued)

*Primary Examiner* — Adam D Rogers
(74) *Attorney, Agent, or Firm* — Oblon, McClelland, Maier & Neustadt, L.L.P.

(57) ABSTRACT

A lubricating device for lubricating components includes first and second lubricant guide plates which have respective inclination angles with respect to a horizontal line such that the angle of inclination of the first lubricant guide plate is smaller than that of the second lubricant guide plate. The inclination angle of the first lubricant guide plate is determined to permit the lubricant oil guided by the first lubricant guide plate to be directed into the catcher reservoir, and to inhibit the lubricant oil from being supplied to component or components disposed above the gear, and the inclination angle of the second lubricant guide plate is determined to permit the lubricant oil guided by the second lubricant guide plate to be supplied to the component or components disposed above the gear.

6 Claims, 4 Drawing Sheets

(51) Int. Cl.
*F16H 57/02* (2012.01)
*F16H 57/037* (2012.01)

(52) U.S. Cl.
CPC ..... *F16H 57/0409* (2013.01); *F16H 57/0457* (2013.01); *F16H 57/0476* (2013.01); *B60Y 2306/03* (2013.01); *F16H 57/037* (2013.01)

(58) Field of Classification Search
CPC ............. F16H 57/0424; F16H 57/0427; F16H 57/0428; F16H 57/045; F16H 57/0457; F16H 57/0476; F01M 9/06; B60Y 2306/03
See application file for complete search history.

(56) References Cited

U.S. PATENT DOCUMENTS

| | | | | |
|---|---|---|---|---|
| 3,529,698 | A * | 9/1970 | Nelson | F16H 57/0447 184/6.12 |
| 8,302,506 | B2 * | 11/2012 | Iwata | F16H 57/0447 74/606 R |
| 8,899,381 | B2 * | 12/2014 | Ebihara | F16H 57/0483 184/6.12 |
| 9,103,432 | B2 * | 8/2015 | Isomura | F16H 57/0423 |
| 9,309,958 | B2 * | 4/2016 | Tanaka | F16H 57/0423 |
| 9,772,027 | B2 * | 9/2017 | Preston | F16H 57/0409 |
| 9,945,472 | B2 * | 4/2018 | Yamada | B60K 6/365 |
| 10,260,616 | B2 * | 4/2019 | Lee | F16H 57/0457 |
| 10,458,533 | B2 * | 10/2019 | Ono | B60K 6/405 |
| 2011/0214947 | A1 * | 9/2011 | Tuomas | F16H 57/0423 184/6.12 |
| 2014/0155214 | A1 | 6/2014 | Kimura et al. | |
| 2019/0195336 | A1 * | 6/2019 | Ichikawa | F16H 57/0423 |

FOREIGN PATENT DOCUMENTS

| | | | | |
|---|---|---|---|---|
| EP | 2 988 027 A2 | | 2/2016 | |
| JP | 60-112748 U | | 7/1985 | |
| JP | 5790630 | | 10/2015 | |
| JP | 2016-33404 | | 3/2016 | |
| JP | 2018028352 A | * | 2/2018 | .......... F16H 3/0915 |
| JP | 2020085145 A | * | 6/2020 | ......... F16H 57/0423 |

* cited by examiner

LUBRICATING DEVICE FOR COMPONENTS WITHIN CASING STRUCTURE OF VEHICULAR POWER TRANSMITTING SYSTEM

This application claims priority from Japanese Patent Application No. 2017-244536 filed on Dec. 20, 2017, the disclosure of which is herein incorporated by reference in its entirety.

FIELD OF THE INVENTION

The present invention relates to a lubricating device for lubrication of components within a casing structure of a vehicular power transmitting system.

BACKGROUND OF THE INVENTION

There is known a lubricating device for lubricating various components within a casing structure of a vehicular power transmitting system. The lubricating device is configured such that a lubricant oil splashed up by rotation of a differential ring gear accommodated within the casing structure is supplied to the various components such as gears, while the lubricant oil is stored in a catcher reservoir. JP5790630B2 discloses an example of such a lubricating device. This publication describes that a differential ring gear, a counter drive gear, a counter driven gear and a catcher reservoir of a power transmitting system of a vehicle are suitably positioned relative to each other, and that a first lubricant guide passage and a second lubricant guide passage are formed to guide a lubricant oil such that the lubricant oil is directed to the catcher reservoir through the second lubricant guide passage, even at an extremely low running speed of the vehicle, so that an oil stirring resistance of the differential ring gear can be reduced. JP2016-33404A and JPS60-112748U disclose the related prior art.

In the lubricating device disclosed in JP5790630B2 wherein the lubricant oil is directed to the catcher reservoir even at the extremely low running speed of the vehicle, an amount of the lubricant oil stored in the catcher reservoir increases with an increase of the running speed of the vehicle. Where the amount of the lubricant oil stored in the catcher reservoir exceeds a storage capacity of the catcher reservoir, the lubricant oil overflowing from the catcher reservoir is again splashed up by the counter drive gear and the other gears, so that there is a risk of increase of a torque loss of the power transmitting system due to stirring of the lubricant oil by the gears.

SUMMARY OF THE INVENTION

The present invention was made in view of the background art described above. It is therefore an object of the present invention to provide a lubricating device including a catcher reservoir and configured to lubricate components within a casing structure of a power transmitting system of a vehicle, which lubricating device permits reduction of a torque loss of the power transmitting system due to stirring of a lubricant oil at a high running speed of the vehicle.

The object indicated above is achieved according to the following modes of the present invention:

According to a first mode of the invention, there is provided a lubricating device for lubricating components within a casing structure of a vehicular power transmitting system including a casing structure, the components including a gear immersed in a lubricant oil staying within the casing structure, the lubricating device comprising: the above-described gear immersed in the lubricant oil; a catcher reservoir formed within the casing structure, for storing the lubricant oil splashed up by the above-described gear; and a first lubricant guide plate and a second lubricant guide plate which are disposed above the above-described gear, for guiding the lubricant oil splashed up by the above-described gear, to the catcher reservoir, and wherein the first and second lubricant guide plates are formed such that the first and second lubricant guide plates do not overlap each other in an axial direction of the above-described gear, the first and second lubricant guide plates having respective inclination angles with respect to a horizontal line such that the inclination angle of the first lubricant guide plate is smaller than that of the second lubricant guide plate, the inclination angle of the first lubricant guide plate being determined to permit the lubricant oil guided by the first lubricant guide plate to be directed into the catcher reservoir, and to inhibit the lubricant oil from being supplied to at least one of the components which is disposed above the above-described gear, and the inclination angle of the second lubricant guide plate being determined to permit the lubricant oil guided by the second lubricant guide plate to be supplied to the at least one of the components which is disposed above the above-described gear.

According to a second mode of the invention, the lubricating device according to the first mode of the invention is configured such that the casing structure includes a first casing member and a second casing member which are fixed together, and the first lubricant guide plate is formed within the first casing member while the second lubricant guide plate is formed within the second casing member.

According to a third mode of the invention, the lubricating device according to the second mode of the invention is configured such that the first lubricant guide plate is an integral part of the first casing member which is a cast body, and the second lubricant guide plate is an integral part of the second casing member which is a cast body.

According to a fourth mode of the invention, the lubricating device according to any one of the first, second and third modes of the invention is configured such that the above-indicated gear is a helical gear having a helix angle determined such that the lubricant oil splashed up by the helical gear is scattered in a direction toward the first lubricant guide plate.

In the lubricating device according to the first mode of the invention, the inclination angle of the first lubricant guide plate is determined to permit the lubricant oil guided by the first lubricant guide plate to be directed into the catcher reservoir, and to inhibit the lubricant oil from being supplied to at least one of the components which is disposed above the above-indicated gear. Accordingly, the lubricant oil guided by the first lubricant guide plate is effectively directed into the catcher reservoir. On the other hand, the inclination angle of the second lubricant guide plate is determined to permit the lubricant oil guided by the second lubricant guide plate to be supplied to the at least one of the components which is disposed above the above-indicated gear. Accordingly, a portion of the lubricant oil guided by the second lubricant guide plate is supplied to the component or components disposed above the above-indicated gear. Therefore, the amount of the lubricant oil directed into the catcher reservoir in the present lubricating device is made smaller than in a prior art lubricating device wherein both of first and second lubricant guide plates are formed so as to effectively direct the lubricant oil into the catcher reservoir, so that the amount of the lubricant oil overflowing from the catcher reservoir is reduced even at a high running speed of the vehicle. Accordingly, it is possible to prevent or reduce a power loss of the power transmitting system due to stirring of the overflow lubricant oil. At a low running speed of the vehicle, the lubricant oil guided by the second lubricant guide plate is supplied to the predetermined components of the power transmitting system. Namely, it is possible to prevent insufficient supply of the lubricant oil to the predetermined components even at the low running speed of the vehicle.

In the lubricating device according to the second mode of the invention wherein the first lubricant guide plate is formed within the first casing member while the second lubricant guide plate is formed within the second casing member, the first and second lubricant guide plates having the different inclination angles can be easily formed within the respective first and second casing members of the casing structure.

In the lubricating device according to the third mode of the invention, the first lubricant guide plate can be easily formed as an integral part of the first casing member formed by casting, and the second lubricant guide plate can also be formed as an integral part of the second casing member formed by casting.

In the lubricating device according to the fourth mode of the invention wherein the helix angle of the helical gear is determined such that the lubricant oil splashed up by the helical gear is scattered in the direction toward the first lubricant guide plate, the lubricant oil splashed up by the helical gear can be effectively directed into the catcher reservoir through the first lubricant guide plate. In addition, the amount of the lubricant oil to be directed into the catcher reservoir can be suitably adjusted by adjusting the helix angle of the helical gear.

DETAILED DESCRIPTION OF A PREFERRED EMBODIMENT

A preferred embodiment of the present invention will be described in detail by reference to the drawings. It is to be understood that the drawings showing the embodiment are simplified or transformed as needed, and do not necessarily accurately represent dimensions and shapes of various elements of the embodiment.

EMBODIMENT

Figure 1:
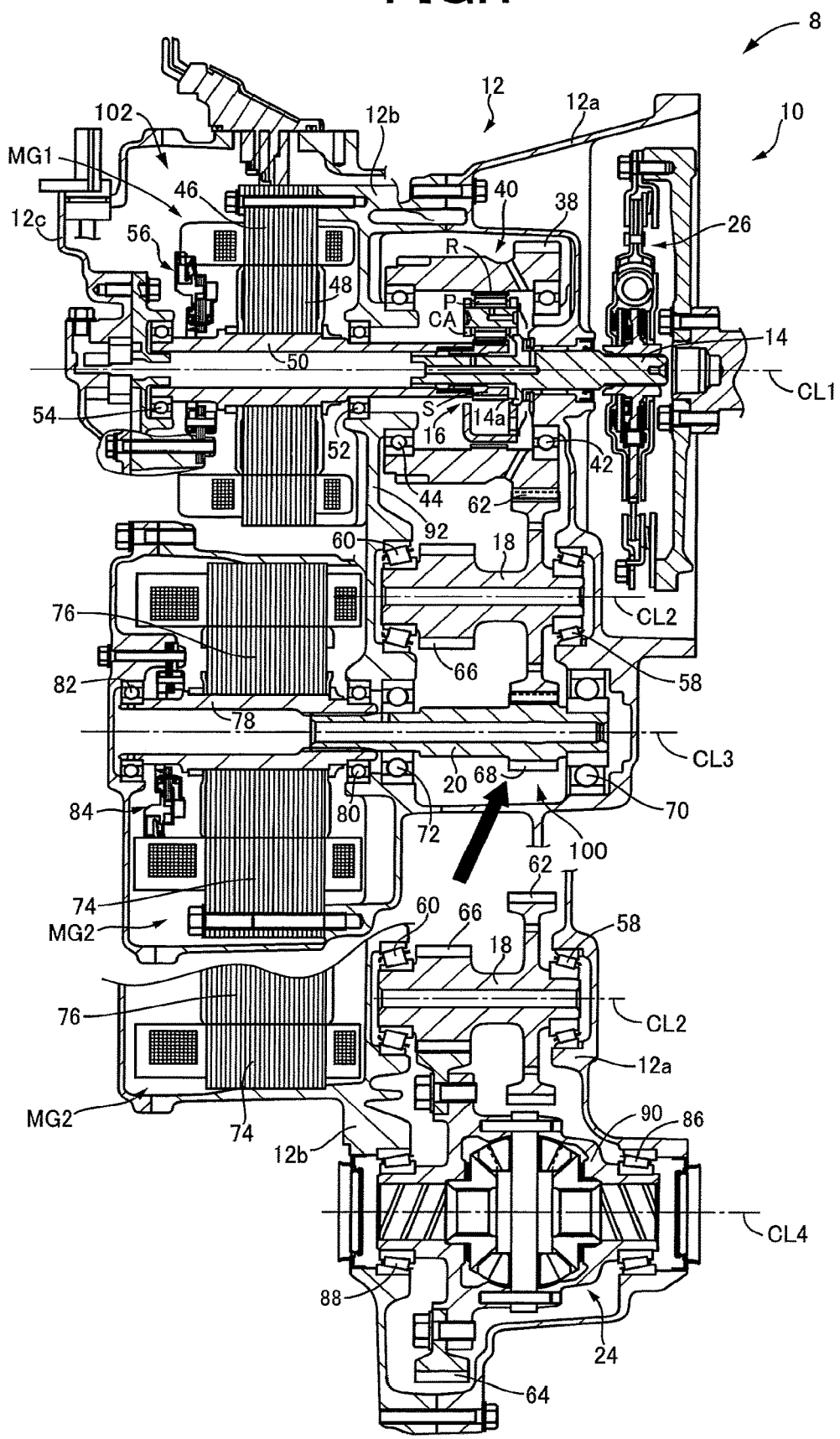
FIG. 1 is a cross sectional view of a vehicular power transmitting system provided with a lubricating device according to an embodiment of this invention.

Reference is first made to FIG. 1, which is the cross sectional view of a power transmitting system 10 of a hybrid vehicle 8, which is provided with a lubricating device according to one embodiment of this invention. The power transmitting system 10 includes an engine (not shown), and a second electric motor MG2, and the hybrid vehicle 8 is of an FF type (front-engine front-drive type) which is driven with one or both of the engine and the second electric motor MG2.

The power transmitting system 10 includes: an input shaft 14, a power distributing mechanism 16 and a first electric motor MG1 which are disposed on a first axis CL1; a counter shaft 18 disposed on a second axis CL2; a speed reduction shaft 20 and the above-indicated second electric motor MG2 which are disposed on a third axis CL3; and a differential gear device 24 disposed on a fourth axis CL4. These components are accommodated within a casing structure 12.

The input shaft 14 is disposed rotatably about the first axis CL1, and is operatively connected at one of its opposite axial ends to the engine (not shown) in a power transmittable manner through a damper device 26. The input shaft 14 has a radially outwardly extending collar portion 14a which is connected at its end part to a carrier CA of the power distributing mechanism 16.

The power distributing mechanism 16 is provided to distribute a drive force of the engine to the first electric motor MG1 and drive wheels (not shown) of the hybrid vehicle 8. The power distributing mechanism 16 is a planetary gear set of a single-pinion type having a sun gear S disposed rotatably about the first axis CL1, a ring gear R operatively connected to the sun gear S in a power transmittable manner through a pinion gear P, and the above-indicated carrier CA supporting the pinion gear P such that the pinion gear P is rotatable about its axis and the first axis CL1.

The sun gear S of the power distributing mechanism 16 is operatively connected to the first electric motor MG1 in a power transmittable manner, and the carrier CA is connected to the collar portion 14a of the input shaft 14, while the ring gear R is operatively connected to the drive wheels in a power transmittable manner.

The ring gear R is formed radially inwardly of and integrally with a composite gear 40. The composite gear 40 is an annular member having the ring gear R integrally formed on its inner circumference, and a counter drive gear 38 integrally formed on its outer circumference. The composite gear 40 is supported at its opposite axial end portions by respective bearings 42 and 44 such that the composite gear 40 is rotatable about the first axis CL1.

The first electric motor MG1 includes a stationary member in the form of a stator 46, a rotor 48 disposed radially inwardly of the stator 46, and a rotor shaft 50 having an outer circumferential surface fixedly fitted to an inner circumferential surface of the rotor 48.

The stator 46 is an annular member consisting of a plurality of annular steel plates superposed on each other and fixed to the casing structure 12 with a plurality of bolts (not shown) such that the annular steel plates are not rotatable. The rotor 48 is an annular member consisting of a plurality of annular steel plates superposed on each other and having the inner circumferential surface fixedly fitted on the outer circumferential surface of the rotor shaft 50. The rotor shaft 50 is supported by bearings 52 and 54 such that the rotor shaft 50 is rotatable about the first axis CL1. The rotor shaft 50 is provided, at its one axial end portion on the side of the bearing 54 as seen in a direction of the first axis CL1, with a resolver 56 for detecting a rotating speed of the first electric motor MG1.

The counter shaft 18 is supported rotatably about the second axis CL2, at its opposite axial end portions as seen in a direction of the second axis CL2, by respective bearings 58 and 60. The counter shaft 18 includes a counter driven gear 62 meshing with the counter drive gear 38, and a drive pinion 66 meshing with a differential ring gear 64 of the differential gear device 24. The counter driven gear 62 also meshes with a speed reduction gear 68 of the speed reduction shaft 20, which will be described.

The speed reduction shaft 20 is supported rotatably about the third axis CL3, at its opposite axial end portions as seen in a direction of the third axis CL3, by respective bearings 70 and 72. The speed reduction shaft 20 has the speed reduction gear 68 meshing with the counter driven gear 62. The speed reduction shaft 20 is splined, at its one axial end portion as seen in the direction of the third axis CL3, to a rotor shaft 78 of the second electric motor MG2.

The second electric motor MG2 includes a stationary member in the form of a stator 74, a rotor 76 disposed radially inwardly of the stator 74, and the rotor shaft 78 having an outer circumferential surface fixedly fitted to an inner circumferential surface of the rotor 76.

The stator 74 is an annular member consisting of a plurality of annular steel plates superposed on each other and fixed to the casing structure 12 with a plurality of bolts (not shown) such that the annular steel plates are not rotatable. The rotor 76 is an annular member consisting of a plurality of annular steel plates superposed on each other and having the inner circumferential surface fixedly fitted on the outer circumferential surface of the rotor shaft 78. The rotor shaft 78 is supported by bearings 80 and 82 such that the rotor shaft 78 is rotatable about the third axis CL3. The rotor shaft 78 is provided, at its one axial end portion on the side of the bearing 82 as seen in the direction of the third axis CL3, with a resolver 84 for detecting a rotating speed of the second electric motor MG2.

The differential gear device 24 is a differential mechanism to transmit rotary motions to right and left axles connected to the respective drive wheels, so as to permit a difference between rotary motions of the axles. The differential gear device 24 includes a differential casing 90 supported rotatably about the fourth axis CL4, at its opposite axial end portions as seen in a direction of the fourth axis CL4, by respective bearings 86 and 88, and the above-described differential ring gear 64 which is fixed to the differential casing 90 and which meshes with the drive pinion 66. In this respect, it is noted that the differential gear device 24 which is well known in the art will not be described in detail of its construction and operation.

The casing structure 12 which is a stationary member consists of three members, namely, a first casing member 12a, a second casing member 12b, and a covering member 12c. The first and second casing members 12a and 12b are bolted or otherwise fixed together so as to maintain fluid tightness at their contacting surfaces, while the second casing member 12b and the covering member 12c are bolted together so as to maintain fluid tightness at their contacting surfaces. It is noted that a plane of interface between the contacting surfaces of the first and second casing members 12a and 12b in the direction of the first axis CL1 is located within an axial dimension of the differential ring gear 64.

The first casing member 12a accommodates the power distributing mechanism 16, the counter shaft 18, the speed reduction shaft 20 and the differential gear device 24, as major components of the power transmitting system 10. On the other hand, the second casing member 12b accommodates the first electric motor MG1 and the second electric motor MG2, as major components of the power transmitting system 10.

The second casing member 12b has a partition wall 92 dividing a space within the casing structure 12, into a space 100 accommodating the power distributing mechanism 16, the counter shaft 18, the speed reduction shaft 20 and the differential gear device 24, and a space 102 accommodating the first electric motor MG1 and the second electric motor MG2. Namely, the partition wall 92 of the casing structure 12 consisting of the first and second casing members 12a and 12b connected to each other defines the space 100 accommodating the power distributing mechanism 16, the counter shaft 18, the speed reduction shaft 20 and the differential gear device 24, and the space 102 accommodating the first electric motor MG1 and the second electric motor MG2.

The power transmitting system 10 constructed as described above incorporates a lubricating device 95 for lubricating predetermined components disposed within the casing structure 12 of the power transmitting system 10, such as the counter drive gear 38 and the other gears, and the bearings supporting the counter shaft 18 and the other shafts.

The lubricating device 95 includes the differential ring gear 64 partially immersed in a lubricant oil staying within a lower part of the casing structure 12, and a catcher reservoir 94 (shown in FIGS. 2 and 3) formed above the counter drive gear 38.

Figure 2:
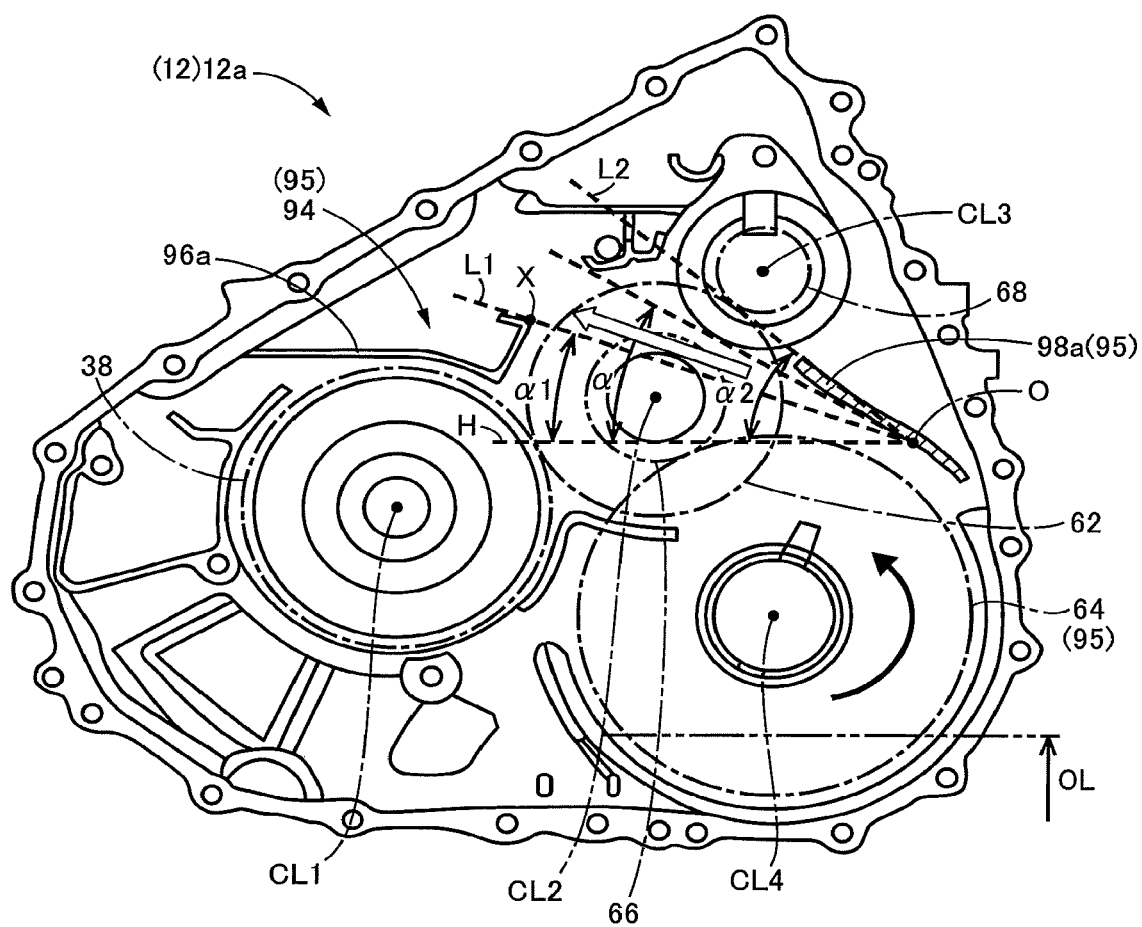
FIG. 2 is an elevational view showing a first casing member and other components of the power transmitting system of FIG. 1, as seen in an axial direction of the rotary components from a second casing member toward the first casing member.

The lower part of the casing structure 12 stores the lubricant oil such that the lubricant oil has an oil level OL indicated by a two-dot chain line in FIG. 2. The lower part of the differential ring gear 64 which is located below the oil level OL is immersed in the lubricant oil. Accordingly, the stored lubricant oil is splashed up with a rotary motion of the differential ring gear 64. The lubricant oil splashed up by the differential ring gear 64 is scattered within the space 100 within the casing structure 12, so that the predetermined components of the power transmitting system 10 such as the gears and the bearings supporting the rotary shafts are lubricated with the scattered lubricant oil. Further, a portion of the lubricant oil splashed up by the differential ring gear 64 is stored in the catcher reservoir 94 formed above the counter drive gear 38, so that the lubricant oil is supplied from the catcher reservoir 94 to the first and second electric motors MG1 and MG2, and the other components. The catcher reservoir 94 is formed or disposed within the space 100 accommodating the power distributing mechanism 16, the counter shaft 18, the speed reduction shaft 20 and the differential gear device 24. It is noted that the differential ring gear 64 corresponds to the gear immersed in the lubricant oil of the present invention.

The differential ring gear 64 is a helical gear having a helix angle determined such that the lubricant oil splashed up by the differential ring gear 64 is scattered in a direction of an arrow-headed line indicated in FIG. 1, namely, in an oblique direction toward the first casing member 12a as seen in the direction of the first axis CL1.

It is noted that an amount of the lubricant oil to be splashed up by the differential ring gear 64 increases with a rise of running speed of the hybrid vehicle 8, that is, with an increase of rotating speed of the differential ring gear 64, so that an amount of the lubricant oil falling down into the catcher reservoir 94 increases with the increase of the rotating speed of the differential ring gear 64. After the amount of the lubricant oil stored in the catcher reservoir 94 exceeds a storage capacity of the catcher reservoir 94, the lubricant oil overflows from the catcher reservoir 94, and is again splashed up by the counter driven gear 62 and the speed reduction gear 68, giving rise to a risk of increase of a power loss of the power transmitting system 10 due to stirring of the lubricant oil. On the other hand, the amount of the lubricant oil to be splashed up by the differential ring gear 64 decreases at a low running speed of the hybrid vehicle 8, giving rise to a risk of an insufficient supply of the lubricant oil to the speed reduction gear 68 and the other components of the power transmitting system 10.

When the temperature of the lubricant oil is extremely low, the lubricant oil has an accordingly high degree of viscosity, a rate of circulation of the lubricant oil through the catcher reservoir 94 is lowered, and the level OL of the lubricant oil stored in the lower part of the casing structure 12 is accordingly lowered. As a result, the amount of the lubricant oil to be splashed up by the differential ring gear 64 is reduced, so that the amount of the lubricant oil to be supplied to the predetermined components of the power transmitting system 10 to be lubricated may become insufficient. In particular, the amount of the lubricant oil to be supplied to the bearing 58 supporting the counter shaft 18 may be insufficient at the extremely low temperature of the lubricant oil.

To solve the problem described above, the casing structure 12 has a first rib 98a and a second rib 98b which are formed above the differential ring gear 64, so as to guide the lubricant oil splashed up by the differential ring gear 64, to flow to the predetermined components to be lubricated and the catcher reservoir 94. These ribs 98a and 98b have different configurations determined to permit adequate distribution of the amount of the lubricant oil to the predetermined components and the catcher reservoir 94, for reducing or preventing an increase of the above-indicated power loss due to stirring of the lubricant oil, and the insufficiency of supply of the lubricant oil to the predetermined components. There will be described configurations and functions of the first and second ribs 98a and 98b formed within the casing structure 12. It is noted that the first rib 98a and the second rib 98b respectively correspond to first and second lubricant guide plates formed within the casing structure 12 of the present invention.

Figure 3:
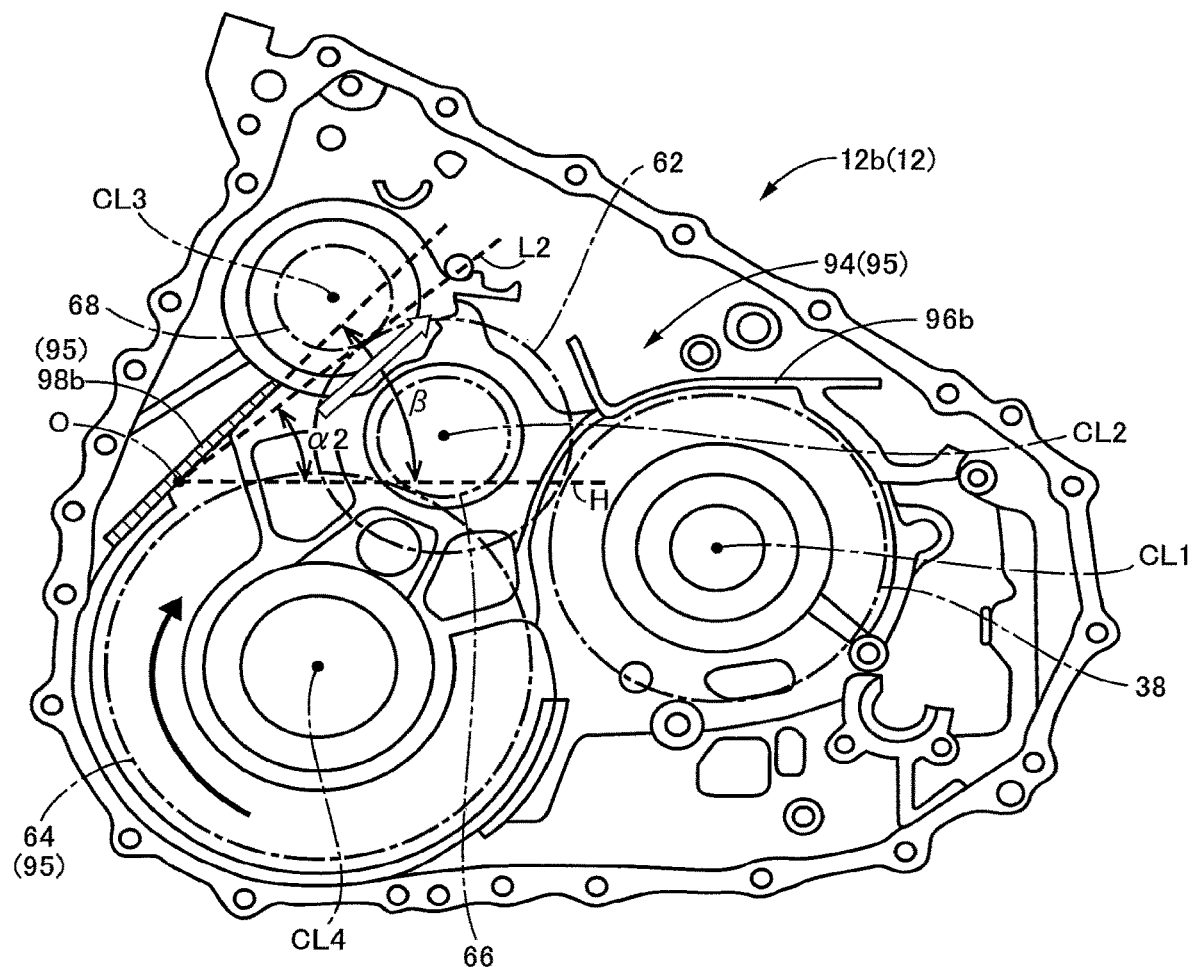
FIG. 3 is an elevational view showing a second casing member and the other components of the power transmitting system of FIG. 1, as seen in the axial direction of the rotary components from the first casing member toward the second casing member.

FIG. 2 is the elevational view showing the first casing member 12a and the other components of the power transmitting system 10, as seen in the axial direction of the rotary components (in the direction of the first axis CL1) from the second casing member 12b toward the first casing member 12a. FIG. 3 is the elevational view showing the second casing member 12b and the other components of the power transmitting system 10, as seen in the axial direction of the rotary components from the first casing member 12a toward the second casing member 12b. FIGS. 2 and 3 show the posture of the casing structure 12 of the power transmitting system 10 when the hybrid vehicle 8 is parked on a level ground or roadway surface.

In FIGS. 2 and 3, a pitch circle of the counter drive gear 38 having the first axis CL1 is represented by a one-dot chain line, and pitch circles of the counter driven gear 62 and the drive pinion 66 having the second axis CL2 are represented by respective one-dot and two-dot chain lines. Further, a pitch circle of the speed reduction gear 68 having the third axis CL3 is represented by a one-dot chain line, and a pitch circle of the differential ring gear 64 having the fourth axis CL4 is represented by a one-dot chain line.

As shown in FIGS. 2 and 3, when the hybrid vehicle 8 is parked on the level ground or roadway surface, the differential ring gear 64 is located at the lowermost position, and the counter drive gear 38 is located above the differential ring gear 64. Further, the counter driven gear 62 and the drive pinion 66 are located above the counter driven gear 38, and the speed reduction gear 68 is located above the counter driven gear 62 and the drive pinion 66.

The catcher reservoir 94 consists of a first wall 96a and a second wall 96b. As shown in FIG. 2, the first wall 96a is formed within the first casing member 12a so as to be located above the counter drive gear 38. The first wall 96a is L-shaped such that an end portion of the first wall 96a on the side of the differential ring gear 64 extends generally upwardly, so that the catcher reservoir 94 can store the lubricant oil splashed up by the differential ring gear 64. The first wall 96a has a predetermined width dimension in the direction of the axes CL1-CL4, and extends from a wall of the first casing member 12a, which is perpendicular to the axes CL1-CL4, up to a plane of interface of the first casing member 12a with the second casing member 12b.

As shown in FIG. 3, the second wall 96b is formed within the second casing member 12b so as to be located above the counter drive gear 38. The second wall 96b is also L-shaped such that an end portion of the second wall 96b on the side of the differential ring gear 64 extends generally upwardly, so that the catcher reservoir 94 can store the lubricant oil splashed up by the differential ring gear 64. The second wall 96b extends from a wall of the second casing member 12b perpendicular to the axes CL1-CL4, and has a predetermined width dimension in the direction of the axes CL1-CL4, up to a plane of interface of the second casing member 12b with the first casing member 12a.

The width dimension of the first wall 96a in the direction of the axes CL1-CL4 is larger than that of the second wall 96b, so that a storage capacity of a portion of the catcher reservoir 94 which is defined by the first wall 96a is larger than that of the other portion of the catcher reservoir 94 which is defined by the second wall 96b.

The L-shaped first and second walls 96a and 96b are held in surface contact with each other at their distal ends after the first and second casing members 12a and 12b are bolted together to form the casing structure 12. As a result, the first and second walls 96a and 96b cooperate with each other to constitute the catcher reservoir 94 for storing the lubricant oil.

The catcher reservoir 94 is formed above the counter drive gear 38. During forward running of the hybrid vehicle 8, the lubricant oil is splashed up by the differential ring gear 64 which is partially immersed in the lubricant oil and which is rotated in the counterclockwise direction as indicated by an arrow-headed line in FIG. 2.

Namely, the differential ring gear 64 is rotated in the clockwise direction as indicated by an arrow-headed line in FIG. 3, to splash up the lubricant oil.

As described above and as shown in FIG. 2, the first rib 98a is formed within the first casing member 12a so as to be located above the differential ring gear 64. The first rib 98a takes the form of a plate having a predetermined width dimension in the direction of the axes CL1-CL4, and extending from the wall of the first casing member 12a perpendicular to the direction of the axes CL1-CL4, up to the plane of interface of the first casing member 12a with the second casing member 12b. In the presence of the first rib 98a, the lubricant oil splashed up by the differential ring gear 64 comes into collision with a lower surface of the first rib 98a, and moves along the lower surface. The first rib 98a is formed by casting, integrally with the first casing member 12a. That is, the first rib 98a is an integral part of the first casing member 12a which is a one-piece cast body.

As described above and as shown in FIG. 3, the second rib 98b is formed within the second casing member 12b so as to be located above the differential ring gear 64. The second rib 98b takes the form of a plate having a predetermined width dimension in the direction of the axes CL1-CL4, and extending from the wall of the second casing member 12b perpendicular to the direction of the axes CL1-CL4, up to the plane of interface of the second casing member 12b with the first casing member 12a. In the presence of the second rib 98b, the lubricant oil splashed up by the differential ring gear 64 comes into collision with a lower surface of the second rib 98b, and moves along the lower surface. The second rib 98b is formed by casting, integrally with the second casing member 12b. That is, the second rib 98b is an integral part of the second casing member 12b which is a one-piece cast body.

As described above, the first rib 98a extends in the direction of the axes CL1-CL4 up to the plane of interface of the first casing member 12a with the second casing member 12b, and the second rib 98b extends in the direction of the axes CL1-CL4 up to the plane of interface of the second casing member 12b with the first casing member 12a. After the first and second casing members 12a and 12b are bolted together, the first and second ribs 98a and 98b are disposed side by side in the direction of the axes CL1-CL4, such that the first and second ribs 98a and 98b do not overlap each other in the direction of the fourth axis CL4, that is, in the axial direction of the differential ring gear 64.

As indicated in FIG. 2, the first rib 98a has an inclination angle $\alpha$ with respect to a horizontal line H. This inclination angle $\alpha$ is determined to be within a range between a first threshold value $\alpha1$ and a second threshold value $\alpha2$. Namely, $\alpha1<\alpha<\alpha2$.

The first threshold value $\alpha1$ is an angle between the horizontal line H, and a straight line L1 connecting a predetermined point O on the first rib 98a, and an uppermost point X of a portion of the first wall 96a of the catcher reservoir 94, which portion is opposed to the first rib 98a, that is, a point X of flow of the lubricant oil from the first rib 98a into the catcher reservoir 94. The second threshold value $\alpha2$ is an angle between the horizontal line H, and a straight line L2 which is one of two tangential lines of the pitch circle of the speed reduction gear 68 from the predetermined point O on the first rib 98a, which straight line L2 is nearer one of the tangential lines to the straight line L1. In other words, the inclination angle $\alpha$ of the first rib 98a is determined to permit the lubricant oil guided by the first rib 98a to be directed into the catcher reservoir 94, and to inhibit the lubricant oil from being supplied to the speed reduction gear 68 disposed above the differential ring gear 64. It is noted that the speed reduction gear 68 corresponds to at least one of the components which is disposed above the differential ring gear 64 of the present invention, that is, above the gear immersed in the lubricant oil.

The inclination angle $\alpha$ of the first rib 98a is selected within the range between the first and second threshold values $\alpha1$ and $\alpha2$, such that the lubricant oil splashed up by the differential ring gear 64 is supplied to the predetermined components, but does not reach the catcher reservoir 94, when the lubricant oil has an extremely low temperature (−30° C. or lower, for instance), and reaches the catcher reservoir 94 when the lubricant oil has a normal temperature or a higher temperature than the normal temperature. The inclination angle $\alpha$ is determined by experimentation or theoretical analysis.

As indicated in FIG. 3, the second rib 98b of the second casing member 12b has an inclination angle $\beta$ which is larger than the second threshold value $\alpha2$ determined with respect to the first rib 98a of the first casing member 12a. Namely, $\beta>\alpha2$. This second threshold value $\alpha2$ is an angle between the horizontal line H, and a straight line L2 which is one of two tangential lines of the pitch circle of the speed reduction gear 68 from a predetermined point O on the second rib 98b, which straight line L2 is nearer one of the tangential lines to the straight line L2. In other words, the inclination angle $\beta$ of the second rib 98b is determined to permit the lubricant oil guided by the second rib 98b to be scattered along the second rib 98b and supplied to the speed reduction gear 68.

As described above, the inclination angle $\alpha$ of the first rib 98a of the first casing member 12a is smaller than the inclination angle $\beta$ of the second rib 98b of the second casing member 12b, and these two inclination angles $\alpha$ and $\beta$ satisfy the following inequality (1). Further, the first and second ribs 98a and 98b which have the respective different inclination angles $\alpha$ and $\beta$ have respective different configurations or shapes. There will be described an operation of the lubricating device 95 including the first and second ribs 98a and 98b.

$$\alpha1<\alpha<\alpha2<\beta \tag{1}$$

During forward running of the hybrid vehicle 8, the differential ring gear 64 is rotated in the counterclockwise direction, as indicated in FIG. 2, so that the lubricant oil staying in the lower part of the casing structure 12 is splashed up by the differential ring gear 64, and is scattered along the first rib 98a.

Since the inclination angle $\alpha$ of the first rib 98a is determined to be within the range between the first and second threshold values $\alpha1$ and $\alpha2$, the scattered lubricant oil is guided by the first rib 98a into the catcher reservoir 94, as indicated by a white arrow-headed line in FIG. 2, and stored in the catcher reservoir 94, when the lubricant oil has a normal temperature. Further, the lubricant oil splashed up by the differential ring gear 64 is scattered in the direction of the arrow-headed line indicated in FIG. 1 due to the helical gear of the differential ring gear 64, namely, in the oblique direction toward the first casing member 12a as seen in the direction of the first axis CL1, so that the lubricant oil is effectively stored in the catcher reservoir 94. It is noted that even at the normal temperature of the lubricant oil, an entirety of the lubricant oil guided by the first rib 98a is not stored in the catcher reservoir 94, but a portion of the lubricant oil is supplied directly to the predetermined components such as the counter drive gear 38 and the bearings.

At the normal temperature of the lubricant oil at which its viscosity is lower than at the extremely low temperature, the rate of circulation of the lubricant oil through the catcher reservoir 94 is accordingly high, so that the lubricant oil is also supplied to the first and second electric motors MG1 and MG2 and the other components through oil passages not shown. Therefore, the amount of the lubricant oil stored in the catcher reservoir 94 does not exceed its storage capacity, and does not overflow from the catcher reservoir 94, so that it is possible to prevent or reduce the power loss of the power transmitting system 10 due to stirring of the overflow lubricant oil by the speed reduction gear 68 and the counter drive gear 38.

At the extremely low temperature of the lubricant oil at which its viscosity is comparatively high, the lubricant oil splashed up by the differential ring gear 64 does not reach the catcher reservoir 94, and is supplied directly to the predetermined components. Further, since the lubricant oil is not stored in the catcher reservoir 94, the amount of the lubricant oil staying in the lower part of the casing structure 12 is increased, and the amount of the lubricant oil to be splashed up by the differential ring gear 64 is accordingly increased, so that a sufficient amount of the lubricant oil is supplied to the predetermined components such as the bearing 58 supporting the counter shaft 18, whereby seizure of the bearings can be prevented or reduced.

On the other hand, since the inclination angle α is smaller than the second threshold value α2, the lubricant oil guided by the first rib 98a of the first casing member 12a is not supplied to the speed reduction gear 68. However, the lubricant oil guided by the second rib 98b of the second casing member 12b is scattered in a direction of a white arrow-headed line indicated in FIG. 3, and is supplied to the speed reduction gear 68. As indicated in FIG. 3, the inclination angle β of the second rib 98b is larger than the second threshold value α2, a portion of the lubricant oil splashed up by the differential ring gear 64 is guided by the second rib 98b to the speed reduction gear 68. Thus, the speed reduction gear 68 is lubricated with a high degree of stability even at a low running speed of the hybrid vehicle 8, so that it is possible to reduce a risk of deterioration of durability of the speed reduction gear 68 due to shortage of supply of the lubricant oil thereto.

Figure 4:
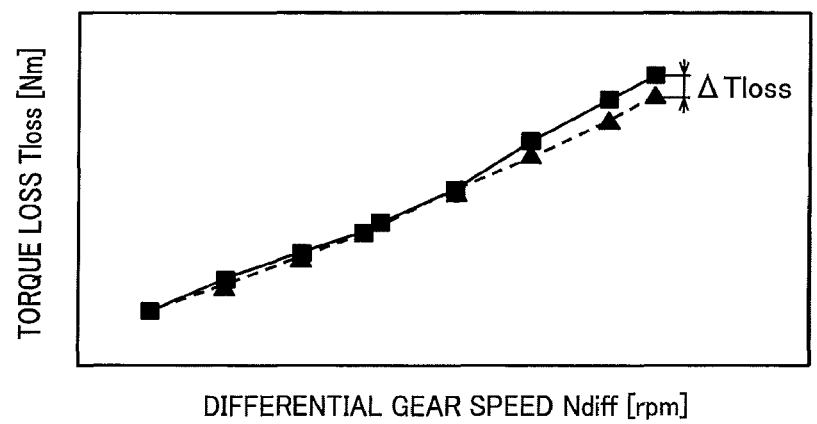
FIG. 4 is a view indicating a relationship between a rotating speed of a differential ring gear of the power transmitting system and a torque loss of the power transmitting system due to stirring of a lubricant oil by the differential ring gear.

FIG. 4 is the view indicating a relationship between a rotating speed Ndiff of the differential ring gear 64 and a torque loss Tloss of the power transmitting system 10. In FIG. 4, the rotating speed Ndiff (rpm) of the differential ring gear 64 is taken along a horizontal axis, while the torque loss Tloss is taken along a vertical axis.

In FIG. 4, a solid line represents measured values of the rotating speed Ndiff and the torque loss Tloss in a comparative example (prior art lubricating device) wherein the lubricant oil splashed up by the differential ring gear 64 is effectively guided by both of first and second ribs so as to be directed into the catcher reservoir 94, with the inclination angle β of the second rib being determined to be equal to the inclination angle α of the first rib. A broken line in FIG. 4 represents measured values of the rotating speed Ndiff and the torque loss Tloss in the present embodiment of the invention.

As indicated in FIG. 4, the measured values of torque loss Tloss in the comparative example and in the present embodiment are almost equal to each other, when the rotating speed Ndiff is comparatively low. However, the torque loss Tloss in the present embodiment is smaller than that in the comparative example by a difference ΔTloss, when the rotating speed Ndiff is comparatively high. The difference ΔTloss increases with an increase of the rotating speed Ndiff.

In the comparative example (prior art wherein both of the ribs formed within the first and second casing members 12a and 12b are formed so as to effectively guide the lubricant oil splashed up by the differential ring gear 64, so as to be directed into the catcher reservoir 94), the amount of the lubricant oil stored in the catcher reservoir 94 exceeds the storage capacity of the catcher reservoir 94 when the rotating speed Ndiff becomes higher than a certain upper limit. As a result, the lubricant oil overflows from the catcher reservoir 94, and the overflow lubricant oil is again splashed up by the counter driven gear 62, for example, so that the torque loss Tloss due to stirring of the lubricant oil is increased.

In the present embodiment, on the other hand, the inclination angle β of the second rib 98b is determined to be larger than the inclination angle α of the first rib 98a, a portion of the lubricant oil splashed up by the differential ring gear 64 is supplied directly to the speed reduction gear 68, so that the amount of the lubricant oil to be directed into the catcher reservoir 94 is made smaller than in the comparative example. Accordingly, the lubricant oil does not overflow from the catcher reservoir 94, so that the torque loss Tloss is made smaller than in the comparative example.

In the lubricating device 95 according to the present embodiment described above, the inclination angle α of the first rib 98a is determined to permit the lubricant oil guided by the first rib 98a to be directed into the catcher reservoir 94, and to inhibit the lubricant oil from being supplied to the speed reduction gear 68. Accordingly, the lubricant oil guided by the first rib 98a is effectively directed into the catcher reservoir 94. On the other hand, the inclination angle β of the second rib 98b is determined to permit the lubricant oil guided by the second rib 98b to be supplied to the speed reduction gear 68. Accordingly, a portion of the lubricant oil guided by the second rib 98b is supplied to the speed reduction gear 68. Therefore, the amount of the lubricant oil directed into the catcher reservoir 94 in the present lubricating device 95 is made smaller than in the prior art lubricating device wherein both of first and second ribs are formed so as to effectively direct the lubricant oil into the catcher reservoir 94, so that the amount of the lubricant oil overflowing from the catcher reservoir 94 is reduced even at a high running speed of the hybrid vehicle 8. Accordingly, it is possible to prevent or reduce the power loss of the power transmitting system 10 due to stirring of the overflow lubricant oil. At a low running speed of the hybrid vehicle 8, the lubricant oil guided by the second rib 98b is supplied to the speed reduction gear 68. Namely, it is possible to prevent insufficient supply of the lubricant oil to the speed reduction gear 68 at the low running speed of the hybrid vehicle 8.

The present embodiment is further configured such that the first rib 98a is formed within the first casing member 12a while the second rib 98b is formed within the second casing member 12b, so that the first and ribs 98a and 98b having the different inclination angles α and β can be easily formed within the respective first and second casing members 12a and 12b of the casing structure 12. Further, the first rib 98a can be easily formed as an integral part of the first casing member 12a formed by casting, and the second rib 98b can be easily formed as an integral part of the second casing member 12b formed by casting.

The present embodiment is also configured such that the helix angle of the helical gear provided as the differential ring gear 64 is determined such that the lubricant oil splashed up by the helical gear is scattered in the direction toward the first rib 98a, so that the lubricant oil splashed up by the helical gear can be effectively directed into the catcher reservoir 94 through the first rib 98a. In addition, the amount of the lubricant oil to be directed into the catcher reservoir 94 can be suitably adjusted by adjusting the helix angle of the helical gear.

While the preferred embodiment of this invention has been described above in detail by reference to the drawings, it is to be understood that the invention may be otherwise embodied.

In the illustrated embodiment, the lubricating device 95 according to the present invention is provided in the power transmitting system 10 of the hybrid vehicle 8 including the first electric motor MG1 and the second electric motor MG2. However, the lubricating device according to the present invention may be provided in a power transmitting system having only an engine as a vehicle drive power source. In essence, the present invention is equally applicable to any lubricating device for lubricating components within a casing structure in which a gear is immersed in a lubricant oil and rotated to splash up the lubricant oil and a catcher reservoir is formed to store the lubricant oil splashed up by the gear.

In the illustrated embodiment, the first and second ribs 98a and 98b are integral parts of the respective first and second casing members 12a and 12b which are formed by casting. However, the first and second ribs 98a and 98b may be formed separately from the respective first and second casing members 12a and 12b, and bolted or welded to the casing members 12a and 12b.

In the illustrated embodiment, the lubricant oil is splashed up in the direction toward the first casing member 12a, by the differential ring gear 64 in the form of the helical gear. However, the differential ring gear 64 may splash up the lubricant oil in the direction toward the second casing member 12b. Where the storage capacity of the second wall 96b of the catcher reservoir 94 formed within the second casing member 12b is larger than that of the first wall 96a of the catcher reservoir 94 formed within the first casing member 12a, for instance, the differential ring gear 64 may be configured to splash up the lubricant oil in the direction toward the second casing member 12b. Namely, the helix angle of the differential ring gear 64 may be determined as needed, to adequately supply the lubricant oil to the predetermined components within the casing structure 12.

In the illustrated embodiment, the second rib 98b is located below the lower end of the speed reduction gear 68. However, a portion of the second rib 98b may be located above the lower end of the speed reduction gear 68.

While the preferred embodiment and modifications have been described for illustrative purpose only, it is to be understood that the present invention may be embodied with various other changes and improvements, which may occur to those skilled in the art.

NOMENCLATURE OF ELEMENTS

12: casing structure
   12a: first casing member
   12b: second casing member
64: differential ring gear (gear)
68: speed reduction gear (predetermined components to be lubricated)
94: catcher reservoir
95: lubricating device
98a: first rib (first guide plate)
98b: second rib (second guide plate)

What is claimed is:

1. A lubricating device for lubricating components within a casing structure of a vehicular power transmitting system, the lubricating device comprising:

a gear immersed in a lubricant oil within the casing structure;

a catcher reservoir formed within the casing structure, for storing the lubricant oil splashed up by said gear; and a first lubricant guide plate and a second lubricant guide plate which are disposed above said gear, for guiding the lubricant oil splashed up by said gear, to the catcher reservoir, wherein the first and second lubricant guide plates are formed such that the first and second lubricant guide plates do not overlap each other in an axial direction of said gear, the first and second lubricant guide plates having respective inclination angles with respect to a horizontal line such that an inclination angle of the first lubricant guide plate is smaller than that of the second lubricant guide plate, the inclination angle of the first lubricant guide plate being determined to permit the lubricant oil guided by the first lubricant guide plate to be directed into the catcher reservoir, and to inhibit the lubricant oil from being supplied to at least one of the components which is disposed above said gear, and the inclination angle of the second lubricant guide plate being determined to permit the lubricant oil guided by the second lubricant guide plate to be supplied to the at least one of the components which is disposed above said gear.

2. The lubricating device according to claim 1, wherein the casing structure includes a first casing member and a second casing member which are fixed together, and the first lubricant guide plate is formed within the first casing member while the second lubricant guide plate is formed within the second casing member.

3. The lubricating device according to claim 2, wherein the first lubricant guide plate is an integral part of the first casing member which is a cast body, and the second lubricant guide plate is an integral part of the second casing member which is a cast body.

4. The lubricating device according to claim 3, wherein said gear is a helical gear having a helix angle determined such that the lubricant oil splashed up by the helical gear is scattered in a direction toward the first lubricant guide plate.

5. The lubricating device according to claim 2, wherein said gear is a helical gear having a helix angle determined such that the lubricant oil splashed up by the helical gear is scattered in a direction toward the first lubricant guide plate.

6. The lubricating device according to claim 1, wherein said gear is a helical gear having a helix angle determined such that the lubricant oil splashed up by the helical gear is scattered in a direction toward the first lubricant guide plate.

* * * * *